Oct. 12, 1926.
D. BOYD
1,602,478
TRANSPORT WHEEL FOR TRACTORS AND LIKE VEHICLES
Filed April 28, 1926
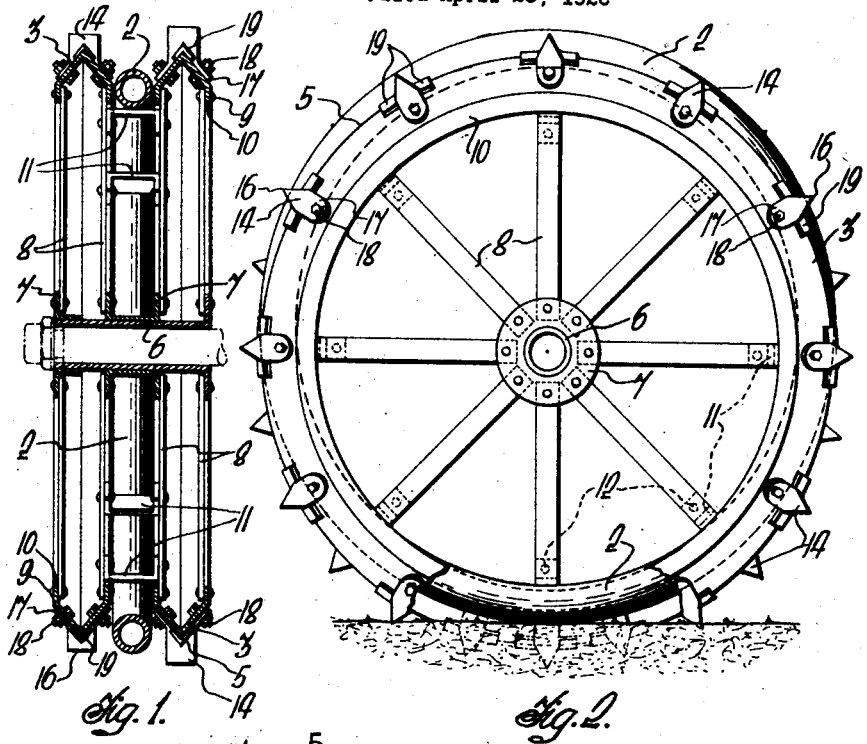
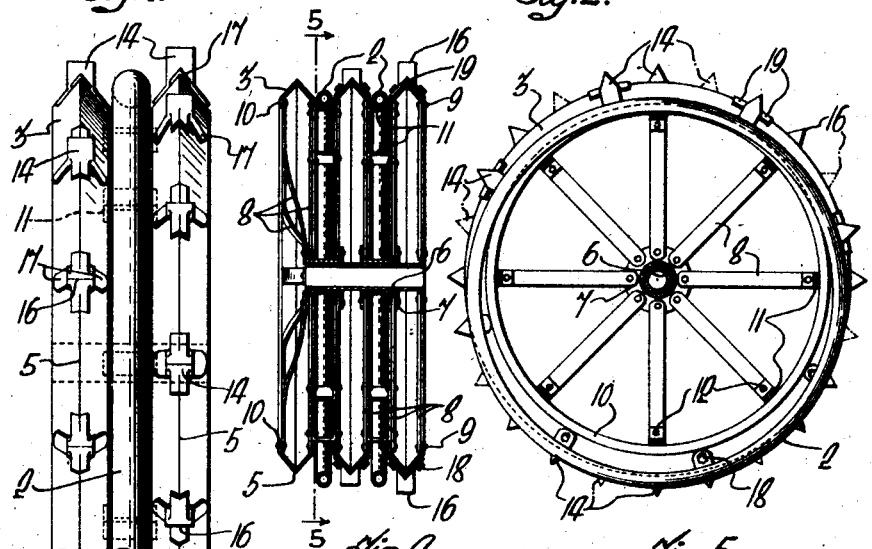
INVENTOR.
Donald Boyd.
By Lacey & Lacey,
Attys Patented Oct. 12, 1926.

1,602,478

UNITED STATES PATENT OFFICE.

DONALD BOYD, OF CAULFIELD, VICTORIA, AUSTRALIA.

TRANSPORT WHEEL FOR TRACTORS AND LIKE VEHICLES.

Application filed April 28, 1926. Serial No. 105,232.

This invention relates to transport wheels for tractors, agricultural implements and other relatively heavy vehicles which are, under certain working conditions, required to travel over or to operate in soil or ground which is comparatively muddy, soft or loose and which is likely to adhere to the wheels of the vehicle.

The primary object of this invention is to provide, for use with transport wheels of tractors and the like, improved means whereby clods, soil, loose earth or other adhesive matter picked up by a wheel will be automatically and immediately cast off, whereby the wheel is prevented from becoming clogged and the maximum gripping surface of the wheel is enabled to engage the ground.

The invention also contemplates the provision of a wheel structure specially adapted to give best effect to the aforementioned dirt-removing means.

The invention comprises an element of substantially ring like formation, which is adapted to be freely mounted between two laterally spaced rim elements of a transport wheel, and has freedom of bodily movement relative to the wheel structure, within certain limits, whereby as the wheel penetrates into the soil, the said element, through resultant contact with the ground surface, is caused automatically to oscillate, whereby it operates between the rim elements to cast off adhesive matter which may have collected upon or between the rim elements and local parts of the wheel. There may be two or more laterally spaced rim elements for each wheel with a dirt-removing or cast-off element disposed freely between adjacent pairs of the rim elements. A ring like dirt-removing element as aforesaid may be composed of metal of standard section, for example tubing, in order that the beneficial working results derived therefrom may be obtained with a minimum of expense or weight. Suitable provision is also made to limit the oscillatory or like motion of the dirt-removing element and such means may also constitute reinforcement for the wheel structure.

The term "transport wheel" employed throughout this specification is to be interpreted as including driving wheels and non-driving wheels of vehicles or machines of the kind indicated.

Referring to the drawings which form part of this specification:—

Figure 1 is a cross sectional elevation of a transport wheel embodying the present improvements and suitable for a tractor, agricultural implement or other relatively heavy vehicle.

Figure 2 is a side view of the wheel seen in Figure 1, a lower portion of the foremost rim element being broken away for the convenience of illustration.

Figure 3 is a fragmentary edge view of a wheel as seen in Figures 1 and 2.

Figure 4 is a cross sectional elevation on a reduced scale of a wheel provided with three laterally spaced rims and with dirt-removing elements located between the rims.

Figure 5 is a part sectional side view of the wheel taken on the line 5—5 in Figure 4.

In the drawings the reference numeral 2 is employed to designate a dirt-removing element, in accordance with the invention, for use with transport wheels for tractors and the like, and the reference numeral 3 is employed generally to designate wheel rim elements between which the dirt-removing element or elements 2 is, or are, disposed and is, or are, adapted to operate as will be fully described hereinafter. The elements 2 are of endless or ring formation and may be composed of metal of any suitable cross section, but it is considered that tubular metal is best suited for the purposes of the invention, the tubiform section providing the maximum of strength compatible with lightness. It will be obvious that a length of metal tubing may be readily fashioned into circular formation and its meeting ends united to thereby form a ring-like dirt-removing element 2 as seen in the drawings.

The rim elements 3 of a wheel according to the invention may be of any suitable shapes but are preferably of substantially V shape when viewed in cross section, each rim element 3 having oppositely inclined side faces which converge outwardly and meet approximately midway of the width of the rim at its outer peripheral edge 5. The rims 3 may be supported about the wheel hub 6 by sets of spokes 8, the inner ends of which may be secured to collars 7 on the hubs and the outer ends of which may be fastened by bolts or rivets 9 to annular flanges 10 projecting radially inwards from the side faces of the rims. The rims 3 are preferably identical one with the other and are spaced laterally apart whereby sufficient space exists between each pair of adjacent rims to freely accommodate a dirt-removing element 2.

Means for limiting movement of the dirt-removing element or elements may include a series of stops or stays 11 which extend laterally between the rims 3 and which may be advantageously secured by bolts or rivets 12 to the spokes 8, thereby imparting strength to the wheel structure. These stays are preferably spaced equidistantly from the wheel axis.

It is usual to equip the rims 3 with grippers such as shown at 14 which are arranged at desired circumferential intervals around the rims, the grippers on one rim being preferably staggered in relation to those on the other rim or rims. Each gripper 14 may be of substantially V shape when viewed sideways of the wheel, the front and rear faces of the grippers converging outwardly to a relatively narrow or sharp ground penetrating edge 16. Each gripper may have sidewardly projecting lugs 17 adapted to lie flat against the respective faces of the V shape rims 3. Bolts 18 or rivets may be employed to secure the grippers 14 to the rims. The grippers may also have front and rear lugs 19 of V cross section conforming to that of the rims 3 to assist in the stability of the grippers. Grippers of any other suitable construction may, however, be used if so desired, while, under some conditions, grippers may be dispensed with.

A transport wheel equipped with a dirt removing element according to the invention functions as follows. When the tractor or like vehicle is travelling over comparatively firm or unyielding ground and the depth of penetration of the grippers is relatively slight, each dirt-removing element 2 is freely suspended or supported by the stay or stays 11 at the upper arc of the wheel and assumes an eccentric attitude relative to the wheel structure. The lower arc or portion of the dirt-removing element may be raised clear of the ground surface as seen in Figures 1, 4 and 5. The rotation of the wheel, however, may impart movement to the dirt-removing element in a circumferential direction.

When the wheel penetrates into the soil, the lower arc or portion of each dirt-removing element 2 contacts with the ground surface and thus causes the element 2 to receive a possibly irregular bodily motion or oscillatory movement in the space between the rims 3. This action of the dirt-removing element casts off any matter which may have gathered upon or between the rims 3 and the grippers 14. The wheel is thus prevented from becoming clogged with mud, clods and other adhesive soil or substances, and the maximum gripping surface is available. In Figure 2 the wheel is depicted in a position at which it has reached its maximum depth of penetration. In such instances the dirt-removing element 2 will be more or less tightly forced against the stay or stays 11 at the lower arc of the wheel and during rotation of the latter, the dirt-removing element will receive a more vigorous motion causing it to oscillate or swing bodily within its permissible limits so as to effectively remove accumulations from, or between, the rims and the grippers.

Having now described my invention what I claim as new and desire to secure by Letters Patent is:—

1. In a transport wheel for tractors and the like a pair of laterally spaced rim elements, and an element of endless formation mounted between said rim elements and free to oscillate whereby to remove matter adhering to the rim elements and local parts of the wheel during rotation of the latter.

2. In a transport wheel for tractors and the like; a plurality of rim elements spaced laterally apart, and circular dirt-removing elements freely mounted one between each adjacent pair of rim elements, each said dirt-removing element normally occupying an eccentric position relative to the wheel structure and adapted to make contact, at its lower arc, with the ground surface when the wheel has penetrated the soil, whereby, during rotation of the wheel, each dirt-removing element is caused to move bodily or to oscillate between the rim elements.

3. In a transport wheel for tractors and the like; a plurality of rim elements spaced laterally apart, a plurality of dirt-removing elements of ring like formation freely located one between each pair of rim elements so as to be capable of oscillation between the rim elements, and means for limiting the movement of said dirt-removing element or elements.

4. In a transport wheel for tractors and the like; a plurality of rim elements spaced apart laterally, a plurality of dirt-removing elements loosely accommodated one between each pair of rim elements so as to normally assume an eccentric position relative to the wheel structure and to be capable of relative movement, and means extending laterally between the rim elements to limit the movement of the dirt-removing elements.

5. In a transport wheel for tractors and the like; a pair of laterally spaced rim elements, a ring-like dirt-removing element freely mounted between said rim elements so as to be capable of movement in a substantially radial direction, and means disposed within the internal diameter of said ring-like element to limit its movement.

6. An improved transport wheel for tractors and the like, comprising in combination, a hub element, a plurality of rim elements, means for supporting said rim elements from the hub so that a lateral space is left between each pair of rim elements, a dirt-removing element of endless formation loosely mounted in the space between each pair of rim elements, and means for limiting the movement of each dirt removing element.

In witness whereof I affix my signature.

DONALD BOYD.